(12) United States Patent
Chatterjee et al.

(10) Patent No.: US 8,549,230 B1
(45) Date of Patent: Oct. 1, 2013

(54) METHOD, SYSTEM, APPARATUS, AND COMPUTER-READABLE MEDIUM FOR IMPLEMENTING CACHING IN A STORAGE SYSTEM

(75) Inventors: Paresh Chatterjee, Fremont, CA (US); Srikumar Subramanian, Fremont, CA (US); Srinivasa Rao Vempati, Milford, MA (US); Suresh Grandhi, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 156 days.

(21) Appl. No.: 12/498,599

(22) Filed: Jul. 7, 2009

Related U.S. Application Data

(62) Division of application No. 11/450,594, filed on Jun. 9, 2006, now abandoned.

(60) Provisional application No. 60/689,587, filed on Jun. 10, 2005, provisional application No. 60/689,471, filed on Jun. 10, 2005, provisional application No. 60/689,219, filed on Jun. 10, 2005.

(51) Int. Cl.
G06F 12/00 (2006.01)
G06F 13/00 (2006.01)
G06F 13/28 (2006.01)

(52) U.S. Cl.
USPC ........... 711/135; 711/113; 711/117; 711/118; 711/170

(58) Field of Classification Search
USPC .......................... 711/170, 117, 113, 135, 118
See application file for complete search history.

(56) References Cited

U.S. PATENT DOCUMENTS

| | | | |
|---|---|---|---|
| 4,942,579 | A | 7/1990 | Goodlander et al. |
| 4,972,316 | A | 11/1990 | Dixon et al. |
| 5,060,144 | A | 10/1991 | Sipple et al. |
| 5,257,367 | A | 10/1993 | Goodlander et al. |
| 5,353,430 | A | 10/1994 | Lautzenheiser |
| 5,579,516 | A | 11/1996 | Van Maren et al. |

(Continued)

OTHER PUBLICATIONS

U.S. Official Action dated Mar. 4, 2008 in U.S. Appl. No. 11/450,594.

(Continued)

*Primary Examiner* — Stephen Elmore
*Assistant Examiner* — Mark Giardino, Jr.
(74) *Attorney, Agent, or Firm* — Meunier Carlin & Curfman, LLC

(57) ABSTRACT

A method, system, apparatus, and computer-readable medium are provided for implementing caching in a data storage system. According to aspects of the invention, a cache module is provided that utilizes cache lines sized according to a snapshot chunk size or an allocation unit size. The cache module utilizes cache header data structures corresponding to cache lines, each of which is assigned a device and logical block access range when active. The active headers are arranged in a set of hash queues. A free queue corresponds to the list of unused cache headers and a dirty queue corresponding to a list of unflushed cache headers. The cache header contains sector-level bitmaps of the cache line, specifying on a per sector granularity the bits that are dirty and valid. Flushing is performed by copying the dirty bitmap into a temporary memory location and flushing the bits set in it, while resetting the dirty bitmap and allowing writes to it. A read-ahead algorithm is used to perform read-ahead operations only in the event of a sequential read.

15 Claims, 12 Drawing Sheets

(56) References Cited

U.S. PATENT DOCUMENTS

| | | | |
|---|---|---|---|
| 5,619,690 | A | 4/1997 | Matsumani et al. |
| 5,720,027 | A | 2/1998 | Sarkozy et al. |
| 5,732,238 | A | 3/1998 | Sarkozy |
| 5,761,709 | A | 6/1998 | Kranich |
| 5,778,430 | A | 7/1998 | Ish et al. |
| 5,790,774 | A | 8/1998 | Sarkozy |
| 5,809,560 | A | 9/1998 | Schneider |
| 5,884,093 | A | 3/1999 | Berenguel et al. |
| 5,893,155 | A * | 4/1999 | Cheriton ............... 711/144 |
| 5,893,919 | A | 4/1999 | Sarkozy et al. |
| 6,038,570 | A | 3/2000 | Hitz et al. |
| 6,098,128 | A | 8/2000 | Velez-McCaskey et al. |
| 6,173,377 | B1 * | 1/2001 | Yanai et al. ............. 711/162 |
| 6,205,450 | B1 | 3/2001 | Kanome |
| 6,216,207 | B1 | 4/2001 | Miller et al. |
| 6,336,175 | B1 | 1/2002 | Shaath et al. |
| 6,389,513 | B1 * | 5/2002 | Closson ............... 711/129 |
| 6,591,334 | B1 | 7/2003 | Shyam et al. |
| 6,594,660 | B1 * | 7/2003 | Berkowitz et al. ........ 707/781 |
| 7,076,604 | B1 * | 7/2006 | Thelin ................. 711/112 |
| 7,249,218 | B2 | 7/2007 | Gibble et al. |
| 7,266,653 | B2 * | 9/2007 | Tross et al. ............ 711/162 |
| 2004/0220932 | A1 * | 11/2004 | Seeger et al. ............ 707/8 |
| 2004/0230737 | A1 * | 11/2004 | Burton et al. ............ 711/3 |
| 2005/0177684 | A1 | 8/2005 | Hoshino et al. |

OTHER PUBLICATIONS

U.S. Official Action dated Sep. 30, 2008 in U.S. Appl. No. 11/450,594.

U.S. Official Action dated Mar. 16, 2009 in U.S. Appl. No. 11/450,594.

U.S. Appl. No. 11/450,518, filed Jun. 9, 2006, entitled "Method, System, Apparatus, and Computer-Readable Medium for Integrating a Caching Module into a Storage System Architecture," Inventors: Chatterjee et al.

U.S. Official Action dated Feb. 21, 2008 in U.S. Appl. No. 11/450,518.

U.S. Official Action dated Sep. 30, 2008 in U.S. Appl. No. 11/450,518.

U.S. Official Action dated May 11, 2009 in U.S. Appl. No. 11/450,518.

U.S. Official Action dated Aug. 27, 2009 in U.S. Appl. No. 11/450,594.

U.S. Notice of Allowance/Allowability, dated Oct. 29, 2009, in U.S. Appl. No. 11/450,518, filed Jun. 9, 2006 entitled "Method, System, Apparatus, and Computer-Readable Medium for Integrating a Caching Module into a Storage System Architecture," Inventors: Chatterjee et al.

"Elementary Data Structures," http//www.2.toki.or.id/book/Alg Design Manual/LEC/LECTUR17/NODE7.htm, Jun. 2, 1997, accessed Feb. 29, 2008, 10 pages.

U.S. Appl. No. 11/450,594, filed Jun. 9, 2006 entitled "Method, System, Apparatus, and Computer-Readable Medium for Implementing Caching in a Storage System," Inventors: Chatterjee et al.

U.S. Official Action dated Nov. 15, 2010 in U.S. Appl. No. 12/713,478, filed Feb. 26, 2010, entitled "Method, System, Apparatus, and Computer-Readable Medium for Integrating a Caching Module into a Storage System Architecture," Inventors: Chatterjee et al.

U.S. Official Action dated Apr. 13, 2011 in U.S. Appl. No. 12/713,478, filed Feb. 26, 2010, entitled "Method, System, Apparatus, and Computer-Readable Medium for Integrating a Caching Module into a Storage System Architecture," Inventors: Chatterjee et al.

* cited by examiner

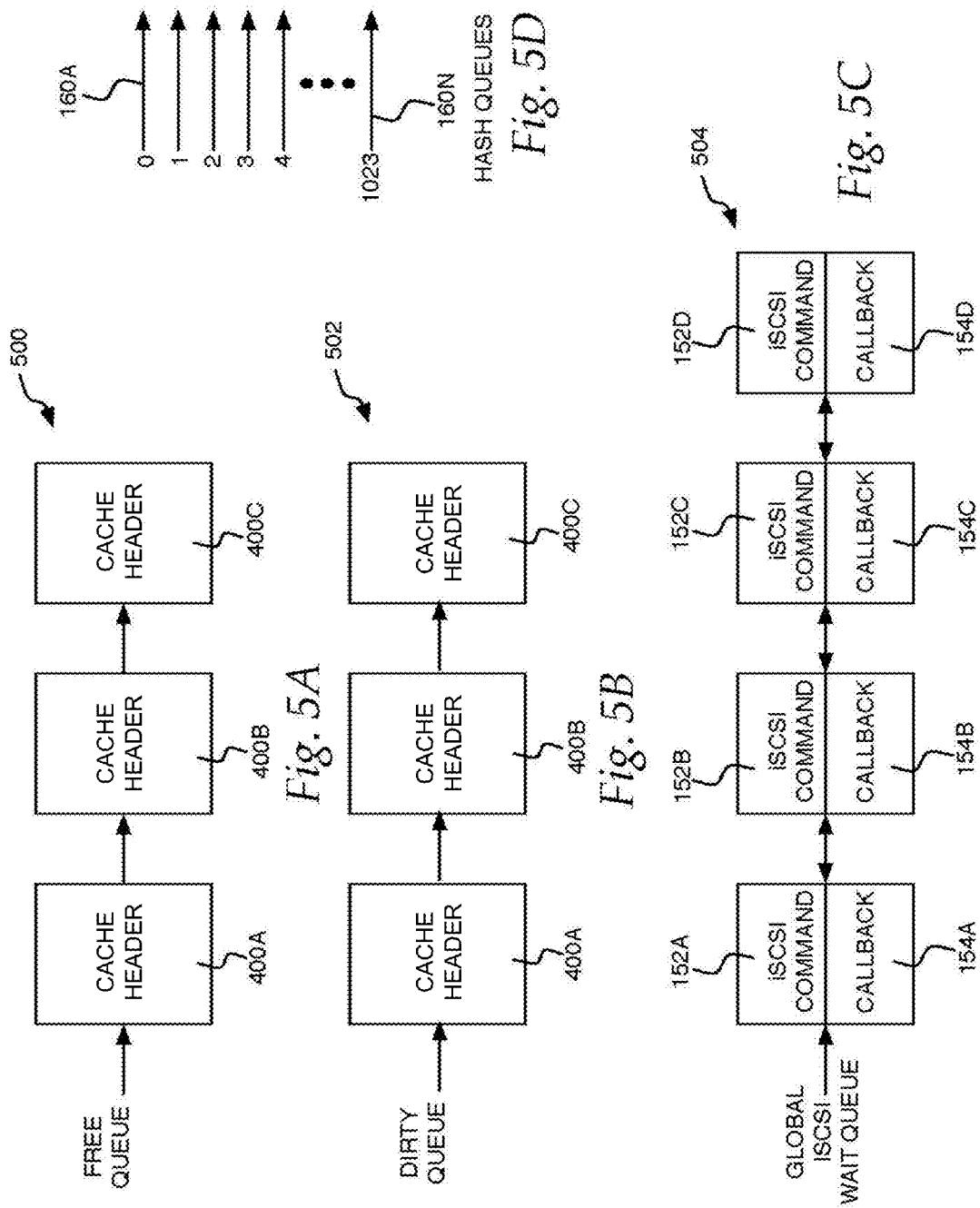

METHOD, SYSTEM, APPARATUS, AND COMPUTER-READABLE MEDIUM FOR IMPLEMENTING CACHING IN A STORAGE SYSTEM

CROSS-REFERENCE TO RELATED APPLICATIONS

This patent application is a divisional of U.S. patent application Ser. No. 11/450,594, entitled "Method, System, Apparatus, and Computer-Readable Medium for Implementing Caching in a Storage System," filed Jun. 9, 2006 now abandoned, which claims the benefit of U.S. Provisional Patent Application No. 60/689,587, filed on Jun. 10, 2005, U.S. Provisional Patent Application No. 60/689,471, filed on Jun. 10, 2005, and U.S. Provisional Patent Application No. 60/689,219, also filed on Jun. 10, 2005, all four of which are expressly incorporated herein by reference in their entirety.

TECHNICAL FIELD

The present invention is related to the field of computer data storage systems. More particularly, the present invention is related to the field of caching in data storage systems.

BACKGROUND OF THE INVENTION

A high speed cache is an indispensable part of any storage system. A cache serves multiple purposes, including collecting multiple and duplicate writes together before eventually flushing them to disk, increasing disk input/output ("I/O") bandwidth utilization, facilitating seek optimization through request sorting, and satisfying read requests from memory without dispatching disk I/O operations.

Caching is offered by many different operating systems. For instance, the LINUX operating system uses a disk cache in its block device and file system architecture. However, the implementation utilized in the LINUX operating system, and many other operating systems, has several limitations in the framework of a specialized storage stack. The main limitation is primarily the result of the utilization of a page cache, in which the unit of caching is a 4 kB page. The manner in which such caches are architected cause a sub-page write request to first read the corresponding 4 kB page, make the requested modification, and later, to flush the entire 4 KB to disk (a read-modify-write cycle). Within a page, multiple sector writes may be collected before the final flush is performed. While the use of a page cache may improve CPU performance, it occasionally introduces a performance penalty rather than a boost because a read-modify-write cycle is forcibly performed.

Traditional disk caching also does little to improve the performance of data storage systems with advanced features such as snapshots. A snapshot is a read-only volume that is a point-in-time image of a data storage volume that can be created, mounted, deleted, and rolled back onto the data storage volume arbitrarily. Snapshots are utilized extensively in the data storage industry for security, backup, and archival purposes. Snapshots may also be utilized within data storage systems that utilize thin provisioning to allocate storage space on demand. If a system has active snapshots, a new write access that has a granularity that is less than the snapshot chunk granularity must necessarily result in a read-modify-write cycle, thereby greatly reducing system performance.

Caching must also be carefully utilized in conjunction with redundant array of inexpensive disk ("RAID") configurations. This is because coalescing of write operations by a cache before flushing may result in a flush write that is more than one RAID stripe long, resulting in multiple RAID accesses. This also can seriously degrade system performance.

It is with respect to these considerations and others that the present invention has been made.

SUMMARY OF THE INVENTION

In accordance with the present invention, the above and other problems are solved by a method, system, apparatus, data structure, and computer-readable medium for implementing disk caching in a data storage computer system. Through the embodiments of the invention, a cache module is provided that utilize cache lines that are sized according to a snapshot chunk size or an allocation unit size. By sizing the cache lines in this manner, unnecessary read-modify-write cycles during sequential writes. The cache line size may also be made equal to the RAID stripe size for convenience. By doing so, I/O operations crossing a RAID stripe can also be avoided. Other embodiments of the invention eliminate the need to lock a cache line while flushing and provide the ability to adaptively read-ahead into a cache line in the event of a sequential read.

According to one aspect of the invention, a method is provided for caching disk data in a computer system that allocates cache lines for storing cached data sized equal to a snapshot chunk size. The snapshot chunk size is the granularity at which snapshots are taken in the computer system. Alternatively, the cache lines may be sized equal to a size of the unit of allocation in a system that allocates storage dynamically on demand. The snapshot chunk size and the unit of allocation may also be sized as multiples of a RAID stripe size. By sizing the cache lines in this manner, unnecessary read-modify-write operations and I/O operations crossing a RAID strip can be avoided.

According to other aspects of the method, a cache header data structure is assigned to each active cache line. The cache header includes pointers that point to the pages of memory that make up the associated cache line. The cache header includes a metadata field for storing metadata indicating the portion of the disk to which the cache line has been assigned. Several queues may also be maintained to organize the cache headers. In particular, a hash queue maintains a list of cache headers associated with a particular logical block address ("LBA") range, a free queue maintains a list of the cache headers that are not currently being used for an I/O operation, and a dirty queue maintains a list of all cache headers corresponding to cache lines that contain data that needs to be flushed. A cache line that is not being used for an I/O operation may still contain valid data, in which case it will also belong to a free queue. A cache line that is currently not taking part in an I/O will be in the free queue, but may also be dirty if it has not been flushed to disk yet. Thus, a cache line may belong to a hash queue, the free queue, and the dirty queue all at the same time. While a cache line may be both free and dirty, a cache line that is free and not dirty may be reallocated to another LBA range.

According to other aspects, the cache header may include a number of bitmap fields. In particular, the cache header may include a dirty bitmap containing bits corresponding to sectors of the associated cache line. Each bit in the dirty bitmap is set or reset to indicate whether the corresponding sector contains data that needs to be flushed to disk. A valid bitmap may also be utilized to store bits corresponding to sectors in the cache line. Each bit in the valid bitmap may be set or reset to indicate whether the corresponding sector contains valid data that may be utilized to satisfy a read request. A reference count data field may also be provided in the cache header for storing data indicating the number of I/O requests that are accessing the cache line associated with the cache header.

According to other aspects, a third bitmap field, the lock bitmap, may be provided in the cache header that is utilized to store bits corresponding to sectors of the cache line. Each bit in the lock bitmap is set or reset to indicate that the corresponding sector has been locked. A pointer may also be provided in the cache header that points to a list of commands that are waiting to obtain a lock for a portion of the cache header.

According to other aspects of the invention, a method is provided for flushing a portion of a disk cache without locking the corresponding cache line. According to one method, a dirty bitmap is maintained for the cache line that includes bits corresponding to each sector of the cache line. Each bit indicates whether the corresponding sector includes data that needs to be flushed to disk. In order to flush a cache line, the contents of the dirty bitmap are copied to a temporary memory location, called a shadow bitmap. Once the contents of the dirty bitmap have been copied to the shadow bitmap, the contents of the dirty bitmap are cleared. The dirty bitmap may be locked, using a spinlock for instance, while its contents are copied to the shadow bitmap and cleared.

Once the dirty bitmap has been copied to the shadow bitmap and cleared, the dirty bitmap may again be modified. The shadow bitmap is then used to identify the sectors of the cache line that need to be flushed. Any identified sectors are flushed to the disk. Once flushing has been completed, the contents of the shadow bitmap are cleared. If all of the bits of the dirty bitmap and the shadow bitmap have been reset, the corresponding cache header may be removed from the dirty queue. Additionally, if the reference count field of the cache header is zero, the cache header is returned to the free queue and the number of available cache headers is incremented.

According to another aspect, a method is provided for performing disk read-ahead into a disk cache. According to one embodiment of the method, a valid bitmap is maintained that includes bits corresponding to the sectors of a cache line. Each bit in the valid bitmap is utilized to indicate whether the corresponding sector of the cache line is valid in the disk cache and can therefore be utilized to satisfy read requests. When a request to read a sector of the disk is received, the bit in the valid bitmap corresponding to the requested sector is identified. A determination is then made as to whether the cache line contains valid data for the sector just prior to the sector that has been requested. This is accomplished by examining the state of the bit in the valid bitmap just prior to the bit corresponding to the requested sector.

If the cache line contains valid data for the sector just prior to the requested sector, as indicated by the appropriate bit in the valid bitmap, it is assumed that a locally sequential read is being performed. Accordingly, a read-ahead operation is performed by reading sequentially into the cache line the portions of the disk corresponding to each of the bits in the valid bitmap following the bit corresponding to the requested sector. This continues until a bit is encountered in the valid bitmap that indicates that valid data is already present in the sector, or until the end of the valid bitmap is reached.

If the bit in the valid bitmap just prior to the bit corresponding to the requested sector is not valid, no read-ahead operation is performed.

The above-described aspects of the invention may also be implemented as a computer-controlled apparatus, a computer process, a computing system, an apparatus, a data structure, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 5A-5D are data structure diagrams illustrating aspects of hash queues, a free queue, a dirty queue, and a global command queue provided by embodiments of the invention;

DETAILED DESCRIPTION OF THE INVENTION

Figure 1:
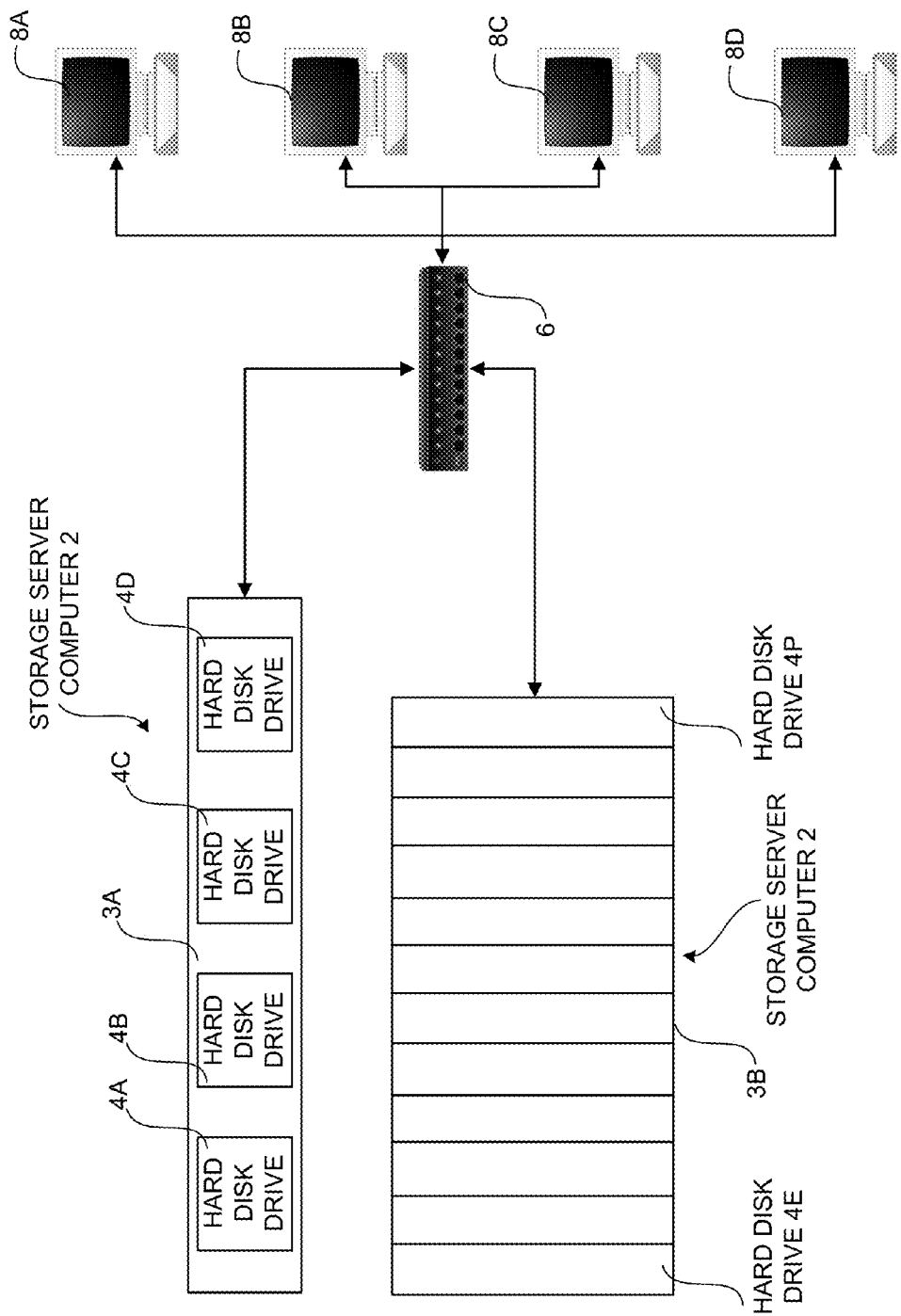
FIG. 1 is a computer architecture diagram showing aspects of a computer network utilized as an illustrative operating environment for the various embodiments of the invention.

Embodiments of the present invention provide a method, system, apparatus, data structure, and computer-readable medium for implementing caching in a data storage system. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 2:
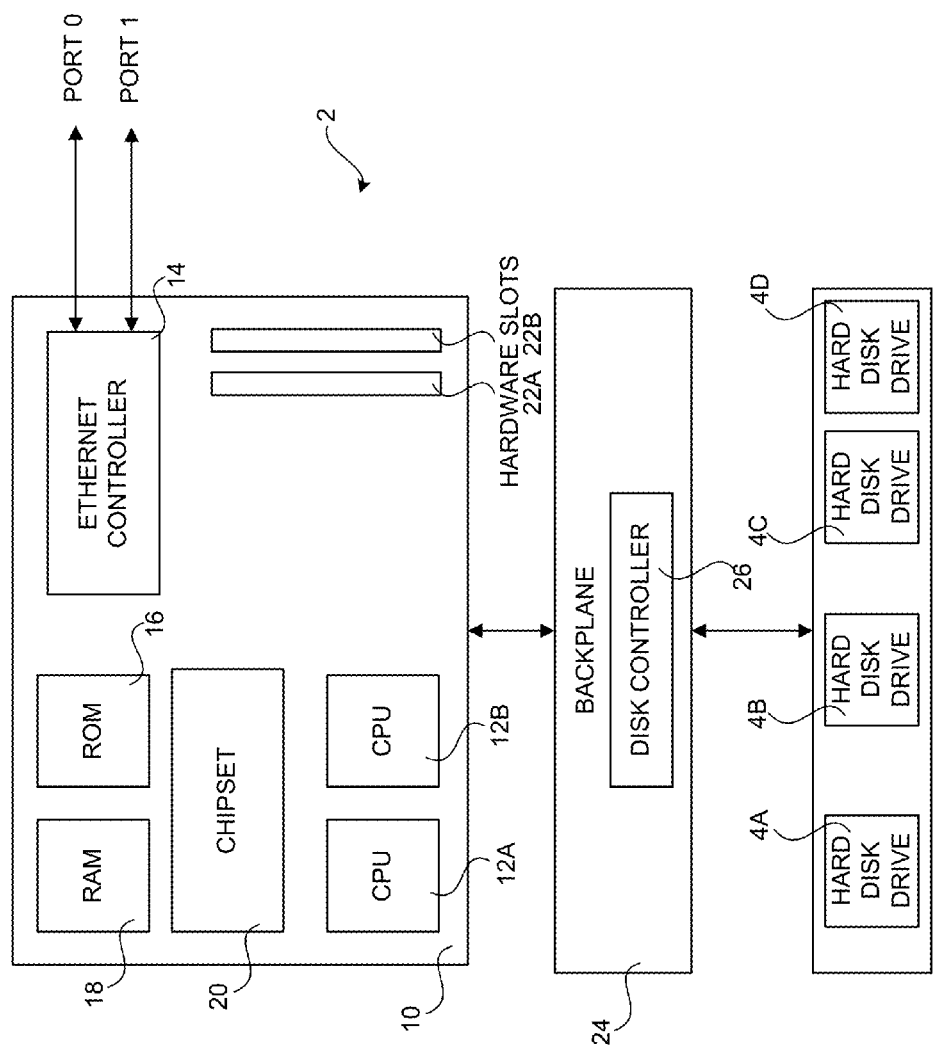
FIG. 2 is a computer architecture and network diagram illustrating aspects of a storage server computer provided by the various embodiments of the invention.
Figure 3:
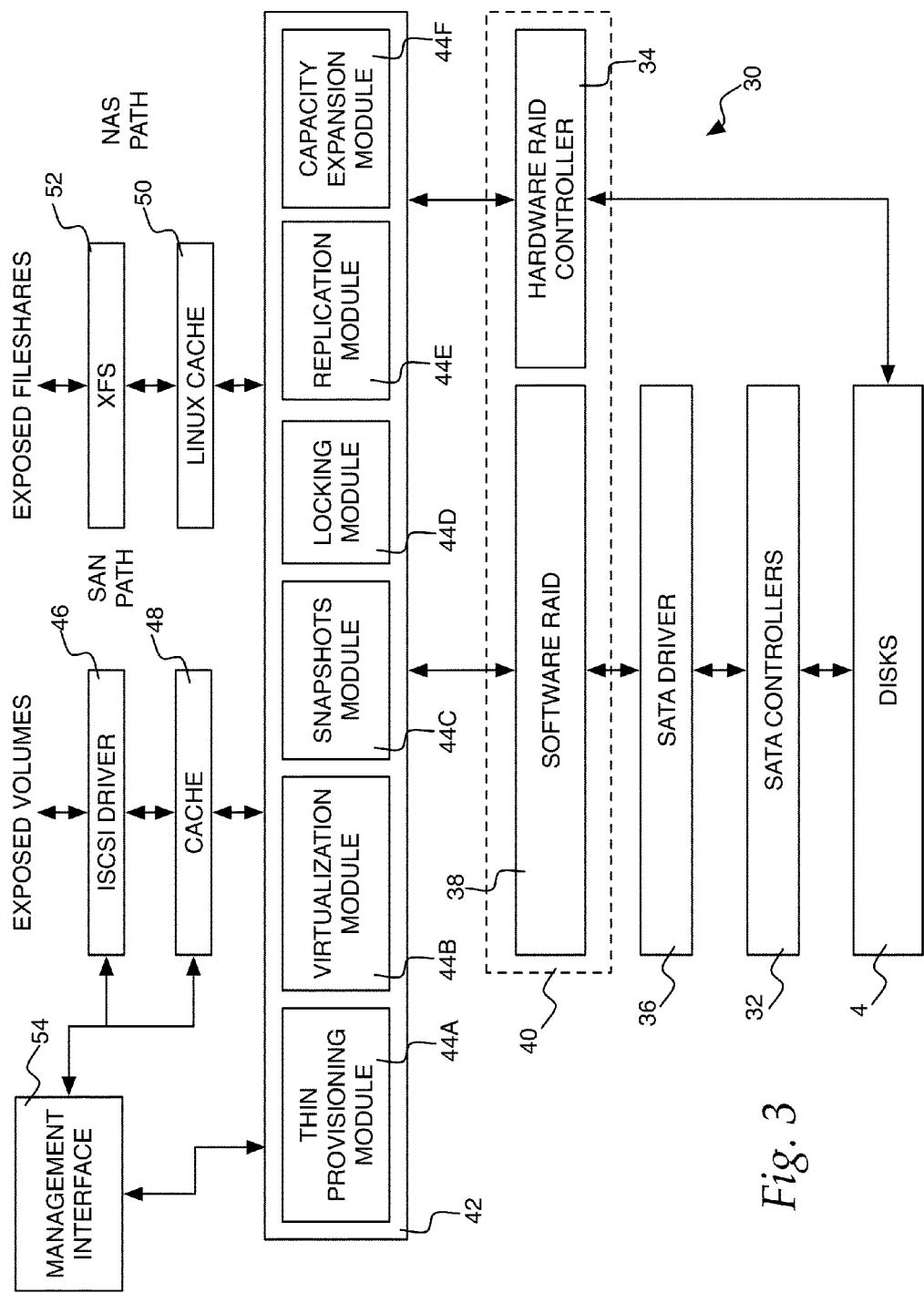
FIG. 3 is a software architecture diagram illustrating various aspects of a storage stack utilized by a storage server provided in embodiments of the invention.

FIGS. 1-3 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. While the invention will be described in the general context of program modules that execute in conjunction with an operating system on a computer system, those skilled in the art will recognize that the invention may also be implemented in combination with other program modules.

Referring now to FIG. 1, an illustrative operating environment for the various embodiments of the present invention will be described. As shown in FIG. 1, the embodiments of the invention described herein may be implemented in a storage server computer 2 that is operative to receive and respond to requests to read and write data to a mass storage device, such as a hard disk drive. According to embodiments of the invention, the storage server computer 2 may be housed in a one rack space unit 3A storing up to four hard disk drives 4A-4D. Alternatively, the storage server computer may be housed in a three rack space unit 3B storing up to fifteen hard disk drives 4E-4P. Other types of enclosures may also be utilized that store fewer or more hard disk drives. In this regard, it should be appreciated that the type of storage enclosure and number of hard disk drives utilized is not generally significant to the implementation of the embodiments of the invention. Any type of storage enclosure and virtually any number of hard disk devices or other types of mass storage devices may be utilized without departing from the spirit and scope of the invention.

According to embodiments, the storage server computer 2 includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which the storage server computer 2 is a part.

The network switch 6 is connected to one or more client computers 8A-8D (also referred to herein as "initiators"). It should be appreciated that other types of networking topologies may be utilized to interconnect the clients and the storage server. It should also be appreciated that the initiators 8A-8D may be connected to the same local area network ("LAN") as the storage server computer 3 or may be connected to the storage server computer 2 via a distributed wide area network, such as the Internet. An appropriate protocol, such as the Internet Small Computer Systems Interface ("iSCSI") protocol may be utilized to enable the initiators 8A-8D to communicate with and utilize the various functions of the storage server computer 2 over a wide area network such as the Internet.

According to the various aspects of the invention, the storage server computer 2 is operative to receive and respond to requests from the initiators 8A-8D to read or write data on the hard disk drives 4A-4P. As described in greater detail herein, the storage server computer 2 is operative to provide advanced features for data storage and retrieval to the clients. In particular, the storage server computer may provide redundant array of inexpensive disks ("RAID") functionality for the hard disk drives 4A-4P. The storage server computer 2 may also allow the hard disk drives 4A-4P to be partitioned into logical volumes for access by the initiators 8A-8D. Additional advanced features described herein, such as thin provisioning, snapshots, and disk caching may also be provided by the storage server computer 2.

Turning now to FIG. 2, an illustrative computer hardware architecture for practicing the various embodiments of the invention will now be described. In particular, FIG. 2 shows an illustrative computer architecture and implementation for the storage server computer 2. In particular, the storage server computer 2 includes a baseboard 10, or "motherboard", which is a printed circuit board to which a multitude of components or devices may be connected by way of a system bus or other electrical communication path. In one illustrative embodiment, these components include, without limitation, one or more central processing units ("CPU") 12A-12B, a network adapter, such as the Ethernet controller 14, a system memory, including a Read Only Memory 16 ("ROM") and a Random Access Memory 18 ("RAM"), and other hardware for performing input and output, such as a video display adapter or a universal serial bus port ("USB"), not all of which are illustrated in FIG. 2.

The motherboard 10 may also utilize a system board chipset 20 implementing one or more of the devices described herein. One or more hardware slots 22A-22B may also be provided for expandability, including the addition of a hardware RAID controller to the storage server computer 2. It should also be appreciate that, although not illustrated in FIG. 2, a RAID controller may also be embedded on the motherboard 10 or implemented in software by the storage server computer 2. It is also contemplated that the storage server computer 2 may include other components that are not explicitly shown in FIG. 2 or may include fewer components than illustrated in FIG. 2.

As described briefly above, the motherboard 2 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 18 and a ROM 16. The ROM 16 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 14 may be capable of connecting the local storage server computer 2 to the initiators 8A-8D via a network. Connections which may be made by the network adapter may include local area network LAN or WAN connections. LAN and WAN networking environments are commonplace in offices, enterprise-wide computer networks, intranets, and the Internet. The CPUs 12A-12B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 10 is connected via a backplane 24 and disk controller 26 to one or more mass storage devices. The mass storage devices may comprise hard disk drives 4A-4D or other types of high capacity high speed storage. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various embodiments of the invention will now be described. In particular, FIG. 3 illustrates a storage stack 30 utilized in the embodiments of the invention. At the top of the storage stack 30, storage volumes or fileshares are exposed to the initiators 8A-8D. At the bottom of the storage stack 30 are the actual mass storage devices, such as the disks 4, that are utilized to store the data. The mass storage devices are, in turn, connected to a disk controller, such as a Serial ATA ("SATA") controller 32 or a hardware RAID controller 34. In the case of a SATA controller, a SATA driver 36 may be utilized to access the hardware device. Additionally, a software RAID module 38 may also be utilized to provide RAID services in the absence of a hardware RAID controller 34. A unified RAID management layer 40 may be utilized to simplify the utilization of RAID with either software or hardware implementations.

Above the unified RAID management layer 40 sits a kernel module 42 that implements some of the functions described herein. In particular, the kernel module 42 may provide functionality for implementing thin provisioning, virtualization, snapshots, locking, replication, and capacity expansion. These features are implemented by the modules 44A-44F, respectively, and are described in greater detail herein. In particular, the thin provisioning module 44A provides the functionality described herein for allocating physical capacity to logical volumes on an as-needed basis. The virtualization module 44B provides functionality for creating virtual tape libraries. The snapshots module 44C provides functionality for creating, utilizing, and managing point in time snapshots of the contents of logical storage volumes. The replication module 44E provides functionality for replication within the computer 2. The capacity expansion module 44F provides functionality for adding storage capacity to the computer 2.

Above the kernel module 42, a number of software components are utilized depending upon the access mechanism utilized to access the data stored on the hard disk drives 4. In particular, a Storage Area Network ("SAN") path is provided that utilizes a caching module 48 and a Internet Small Computer Systems Interface ("iSCSI") driver 46. A Network Attached Storage ("NAS") path is also provided that utilizes a LINUX cache 50 and the XFS high-performance journaling file system 52. Volumes are exposed through the SAN path while fileshares are exposed through the NAS path. Additional details regarding the operation of the caching module 48 will be provided below with respect to FIGS. 7-11C. It should be appreciated that the invention may also be implemented in the LINUX cache 50 or in other types of software or hardware cache devices.

It should also be appreciated that the kernel module 42 comprises a LINUX-compatible mass storage device driver in the embodiments of the invention described herein. However, although the embodiments of the invention are described as being implemented within a LINUX-compatible device driver, the various aspects of the invention may be implemented at different points within the storage stack and in conjunction with other operating systems. For instance, the aspects of the invention may be implemented with the FREEBSD operating system or with the WINDOWS family of operating systems from MICROSOFT CORPORATION of Redmond, Wash.

According to embodiments of the invention, a management interface 54 may also be provided for controlling and monitoring the various aspects of the present invention. The management interface communicates with the various layers through software interfaces to retrieve performance data, provide configuration data, and to perform other functions.

Referring now to FIGS. 4 and 5A-5C, additional details will now be provided regarding the embodiments of the invention for implementing caching within the computer 2. As described briefly above, the caching module 48 is operative to provide functionality for caching the contents of the disks 4 in the memory of the computer 2. In general, cached data from the disks 4 can be utilized to satisfy read requests quicker than actually reading the requested data from the disks 4. FIGS. 4-11C illustrate additional aspects of the configuration and use of the caching module 48.

Figure 4:
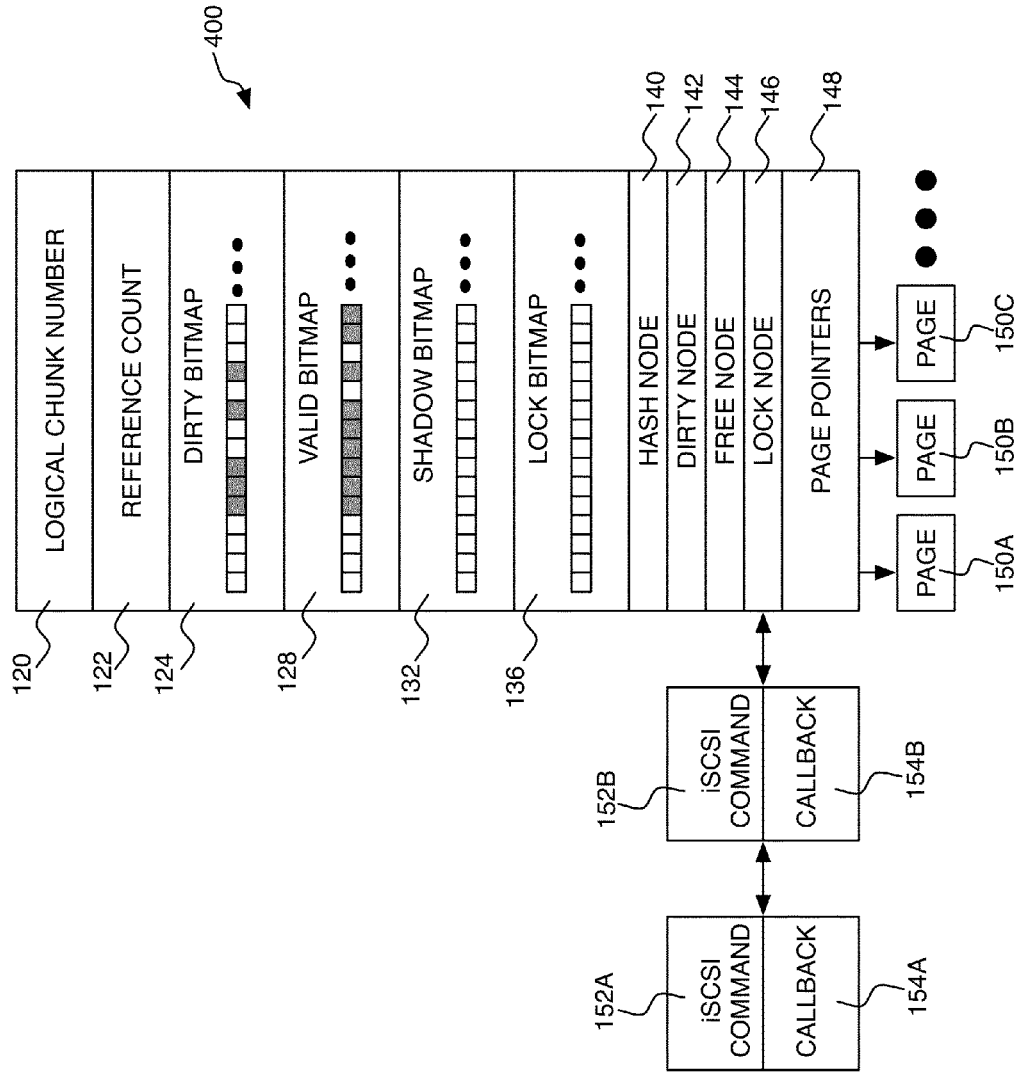
FIG. 4 is a data structure diagram illustrating aspects of a cache header data structure provided by embodiments of the invention.

FIG. 4 illustrates aspects of a cache header data structure 400 utilized by the cache module 48 to manage its caching operations. A cache header 400 is utilized to store data that is associated with a particular cache line. A cache line is a set of memory locations that are utilized to cache data for a portion of the disk. According to embodiments, each cache line is sized according to the unit of snapshot read-modify-write (the snapshot chunk size). Alternatively, the size of each cache line may be set equal to the unit of allocation in a thin provisioned system (the provision). According to one embodiment, the snapshot chunk size is 64 kB and the size of a provision is 1 MB. In either case, the size of each cache line may be set as equal to the RAID stripe size utilized by the computer 2, to avoid I/O operations that span multiple RAID stripes. Each active cache line is associated with a cache header 400.

According to embodiments, each cache header 400 may include a logical chunk number field 120 that indicates the logical portion of the disks 4 that the cache header corresponds to. This field may also contain a device identifier, in case multiple disks are being cached by the same cache, to identify the device that the logical chunk number corresponds to. The cache header 400 may also include a reference count field 122 that is utilized to store data indicating the number of I/O operations that are currently accessing the associated cache line. Additional details regarding the use of the reference count field 122 will be provided below. The cache header 400 also includes page pointers 148 that point to the actual pages 150A-150C of memory that make up the cache line associated with the particular cache header 400.

Although the size of each cache line is typically greater than one sector (typically 512 bytes), it is useful to account for data within each cache line on a sector granularity. This enables the ability to avoid costly read-modify-write cycles that traditional caching may introduce. Accordingly, in one embodiment sector-level reckoning of data is performed by means of two bitmaps, each of which is 128 bits long for a 64 kB cache line size. These bitmaps are the dirty bitmap 124 and the valid bitmap 128. Each bit within the bitmaps 124 and 136 corresponds to a sector within the corresponding cache line. A bit corresponding to a sector is set in the dirty bitmap 124 if the data for that sector is present and up-to-date in the cache line but has not yet been updated on disk. A bit corresponding to a sector is set in the valid bitmap 124 if the data for that sector is contained in the cache line and can be utilized to satisfy read requests. The dirty bitmap 124 and the valid bitmap 12 are not mutually exclusive. A sector that is dirty is always valid, but a valid sector may or may not be dirty.

A cache line may be in several states, or a supposition of two or more states. If a cache line is active (i.e. it contains at least one sector that is valid), it is also uniquely associated with a particular LBA range corresponding to the amount of memory the cache line addresses. If any reads occur to this LBA range, data is read from the cache line instead of from the disk.

The mapping from cache line to LBA range and vice versa must be done rapidly in order for the cache to speed up I/O maximally. In order to do the former association, each cache line has a field that includes the device identifier and the LBA location 120. The latter association is performed through a set of hash buckets. The entire possible LBA range is divided into a certain number of lists (1024 in one embodiment). Whenever a cache line belongs to the range associated with a list, it is added to a corresponding queue. A particular cache header is added to the appropriate queue by creating a link in the hash node 140. The queues corresponding to all of the hash buckets are called the hash queues 160A-160N. The hashing algorithm by which the LBA range is divided into hash buckets may be a simple modulo-1024 algorithm. Using this algorithm, all LBAs that have the same remainder when divided by 1024 are in the same bucket. The device identifier is ignored in this hashing algorithm. Other hashing algorithms known to those skilled in the art may be utilized.

The cache described herein may be utilized in either writeback or write-through mode. If the cache is utilized in writeback mode, the cache will accumulate writes before dispatching them, and will consequently contain sectors that are dirty. If at least one sector of a cache line is dirty, the cache line itself is considered dirty and needs to be flushed to disk either in whole or in part. A queue maintains a list of all cache lines that need to be flushed. This queue is called the dirty queue 502. As shown in FIG. 5B, cache headers 400A-400C may be added to the dirty queue 502. The dirty node 142 of the cache header 400 is a link that can be utilized to add a cache header to the dirty queue 502. The dirty queue 502 is organized in a least recently used ("LRU") fashion. That is, the cache header corresponding to the cache line that has most recently had a write is at the end of the list. If the cache is utilized in write-through mode, data is always flushed to the disk as soon as it is written, and the dirty queue 502 is always empty.

A cache line may be currently in use for an I/O operation, or it may not. As mentioned above, the reference count field 122 is utilized to store data indicating the number of I/O operations that are currently accessing the associated cache line. All cache lines that have a zero reference count belong to a queue called the free queue 500. The free queue 500 is also LRU. The cache header data structure 400 includes a free node 144, which is a link for adding the cache header to the free queue 500. As shown in FIG. 5A, the cache headers 400A-400C have been added to the free queue 500.

A cache line that is not being used for an I/O operation will belong to the free queue 500. The cache line may still contain valid data, in which case it will also be present in one of the hash queues depending on its LBA location. An unused cache line may also be dirty and belong to the dirty queue 502. Thus, a cache line may belong to a hash queue 160A-160N, the free queue 500, and the dirty queue 502 all at the same time. While a cache line may be both free and dirty, a cache line that is free and not dirty may be reallocated to another LBA range.

If the cache is utilized in write-back mode, a dirty cache line will eventually need to be flushed, either because it has aged or because the cache line is needed for another logical address. Traditionally, a cache line that is being flushed is locked, so that no other write I/O operations can use the cache line until it has been flushed completely. However, in the architecture described herein, a lock is not needed for this purpose.

When a cache line is being flushed, it is necessary to protect its dirty bits. To prevent a cache line from being reused before it is flushed, the dirty bits may be reset only after the flush completes. However, if there are writes that change the cache line after the flush has been initiated but before the bits have been reset, the completion of the flush will falsely signal the completion of the flushing of the intervening writes also. This will cause data corruption. Therefore, in order to avoid this from occurring without locking the cache line, a flush operation resets the dirty bits in the dirty bitmap 124 before it begins flushing the corresponding sectors. However, the contents of the dirty bitmap 124 are protected by copying them into a temporary memory location, called the shadow bitmap 132, which is cleared only after the flushing operation has been completed. The shadow bitmap 132 controls when a cache line may be removed from the dirty queue 502, but the dirty bitmap 124 controls which sectors will be flushed in the next flushing cycle. Additional details regarding the use of the shadow bitmap 132 and the flushing mechanism are provided below with respect to FIGS. 9A-9E.

Although locking of a cache line is not necessary for the purpose of synchronizing the flushing operation, it may still be required for other situations. For example, locking of a cache line is required for read-ahead I/O operations and for preventing read-after-write data corruptions. Accordingly, in order to enable locking of a cache line, a lock bitmap 136 is provided in each cache header 400. The bits of the lock bitmap 136 correspond to the sectors in the cache line. The bits of the lock bitmap 136 are set or reset, to indicate which of the sectors of the cache line are locked or unlocked. In this manner, locking of a cache line can be performed utilizing a per-sector granularity.

When an I/O command requests access to a cache line, and one or more of the sectors that are being requested are locked (as indicated by the lock bitmap 136), the I/O command must wait. In order to maintain a queue of all I/O commands waiting on a cache line lock, the cache header 400 includes a lock node 146 which points to a list of I/O commands in the global command queue 504, such as the commands 152A-152B. Each command also includes a callback 154A-154D, respectively. When a lock is released, the list pointed to by the lock node 146 is traversed to find the next command to grant the lock to. The appropriate callback is utilized to notify the I/O command that the lock is available. By calling waiting requests back rather than polling, a computationally expensive polling operation is avoided.

Figure 6A:
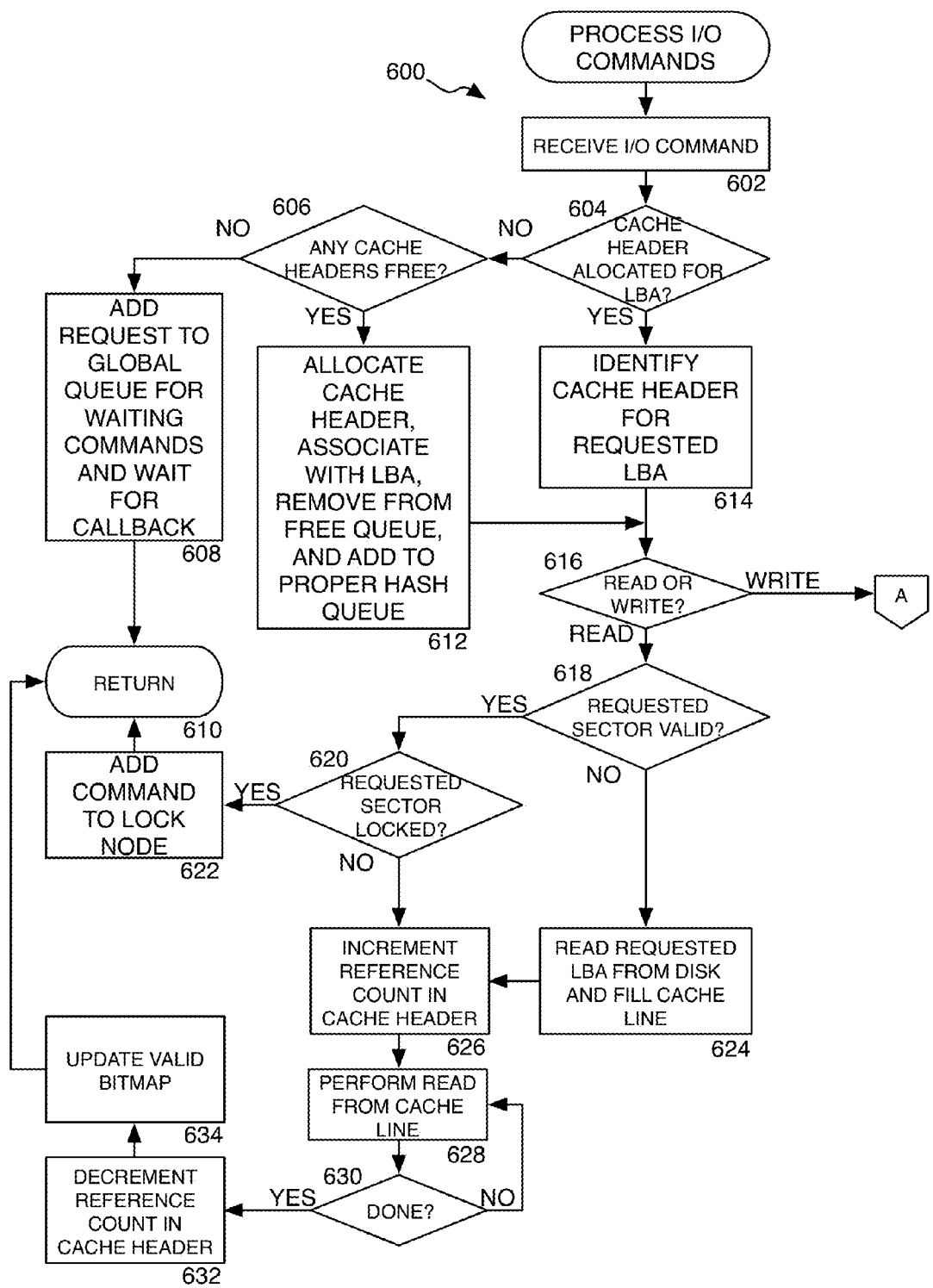
FIGS. 6A-6b are flow diagrams showing an illustrative routine for processing I/O commands by a cache module according to one embodiment of the invention.
Figure 6B:
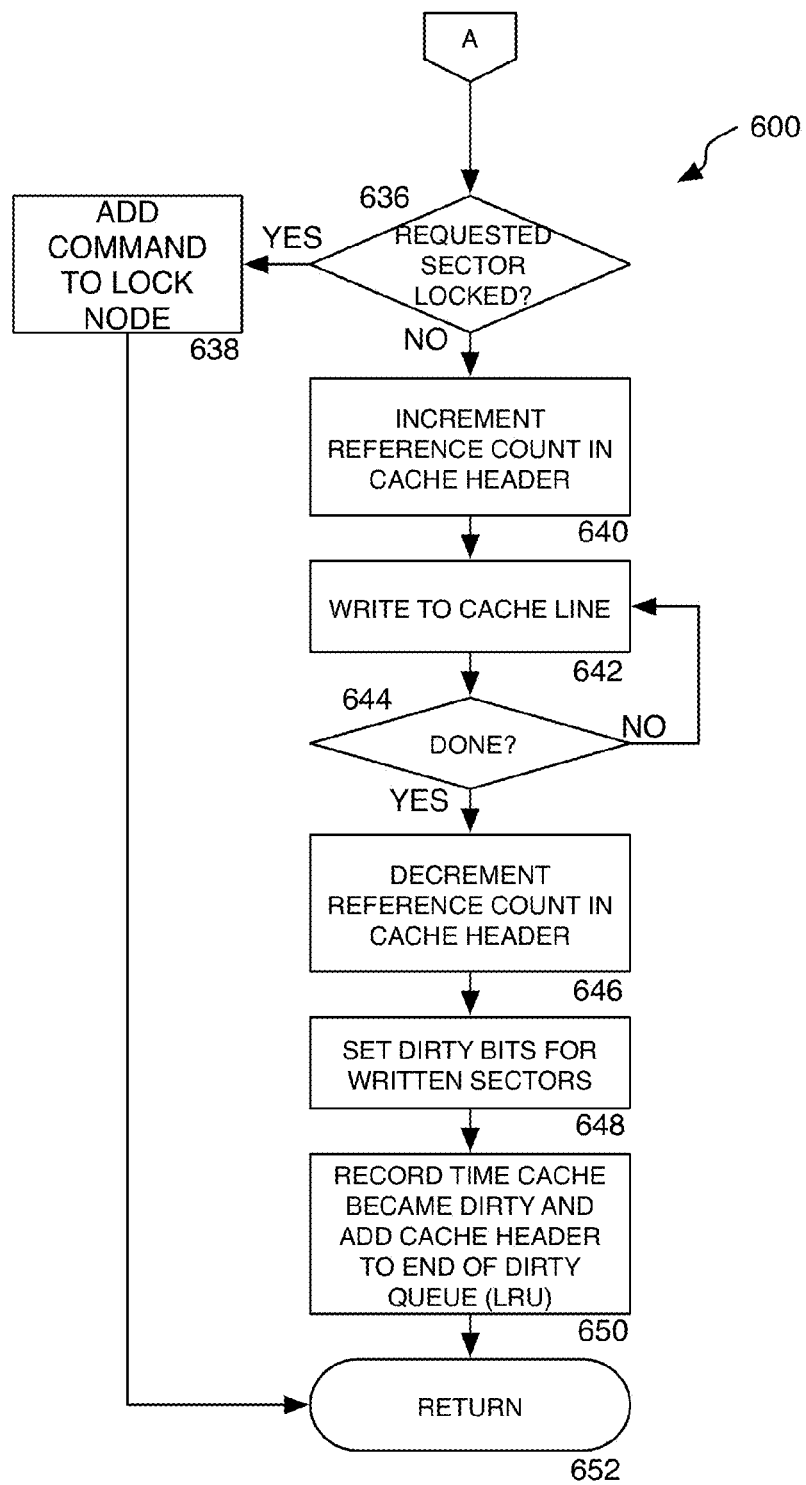

Referring now to FIGS. 6A-6B, additional details regarding the operation of the computer 2 for caching I/O commands will be provided. In particular, a routine 600 will be described illustrating operations performed by the computer 2 for caching disk data utilizing the cache module architecture described herein. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 6A-6B, 7A-7B, 8, and 10, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where an I/O request is received, such as a read or write command. From operation 602, the routine 600 continues to operation 604, where a determination is made as to whether a cache header 400 has been allocated for the LBA referenced by the I/O request. If a cache header 400 has not been allocated for the LBA, the routine 600 branches to operation 606. At operation 606, a determination is made as to whether there are any free cache headers. This may be accomplished by examining the free queue 500. If no cache headers are free, the routine 600 branches to operation 608, where the I/O request is added to the global wait queue 604. The I/O request then waits for a callback indicating that a cache header has become available. If, at operation 606, it is determined that there are free cache headers, the routine 600 continues to operation 612, where a cache header is allocated from the free queue 600, the cache header is associated with the LBA range, and the cache header is added to the appropriate hash queue 160. The routine 600 then continues from operation 612 to operation 616.

If, at operation 604, it is determined that a cache header has been previously allocated for the LBA, the routine 600 continues from operation 604 to operation 614. At operation 614, the cache header for the requested LBA is identified. The routine 600 then continues to operation 616, where a determination is made as to whether the received I/O request is for a read or for a write. If the request is for a read, the routine 600 continues from operation 616 to operation 618. If the request is for a write, the routine 600 branches from operation 616 to operation 636.

At operation 618, a determination is made as to whether the requested sector is valid in the cache. This is accomplished by examining the appropriate bit in the valid bitmap 128 in the cache header 400 corresponding to the requested LBA range. If the requested sector is not valid in the cache, the routine 600 continues to operation 624, where the requested sector is read from disk to fill the cache line. An adaptive read-ahead may be performed such as that described below with reference to FIGS. 11A-11C. The routine 600 then continues from operation 624 to operation 626. If the requested sector is valid in the cache, the routine 600 branches to operation 620, where a determination is made as to whether the requested sector is locked. This determination is made by examining the bit in the lock bitmap 136 corresponding to the requested sector. If the requested sector is locked, the routine 600 branches to operation 622, where the request is added to the lock node 146 for the cache line. If the requested sector is not locked, the routine 600 continues from operation 620 to operation 626.

At operation 626, the contents of the reference count field 122 in the cache header 400 is incremented. The routine 600 then continues to operation 628, where the actual read is performed from the cache line. Once the read operation has been completed, the routine 600 branches from operation 630 to operation 632 where the contents of the reference count field 122 are decremented. The routine 600 then continues to operation 634, where the valid bitmap 128 is updated to account for any data read into the cache header from the disk. From operations 608, 622, and 634, the routine 600 continues to operation 610, where it returns.

At operation 636 the processing of a write operation begins by determining if the requested sector is locked. This is accomplished by examining the appropriate bit in the lock bitmap 136. If the sector is locked, the routine 600 branches to operation 638, where the request is added to the lock node 146. If the requested sector is not locked, the routine 600 continues to operation 640, where the contents of the reference count field 122 is incremented. The routine then continues to operation 642, where the write is performed to the appropriate portion of the cache line (in write-through mode, the write is made directly to the disk). Once the write operation has been completed, the routine 600 continues to operation 646, where the contents of the reference count field 122 is decremented. At operation 648, the contents of the dirty bitmap 124 for the cache line are updated to reflect the sectors that were written to. At operation 650, a record is made of the time the cache line became dirty and the cache header 400 is added to the end of the dirty queue 502. As will be described in greater detail below, the amount of time that has elapsed since a cache line became dirty may be utilized when determining which cache lines to flush to disk. From operation 650, the routine 600 continues to operation 652, where it returns.

Figure 7B:
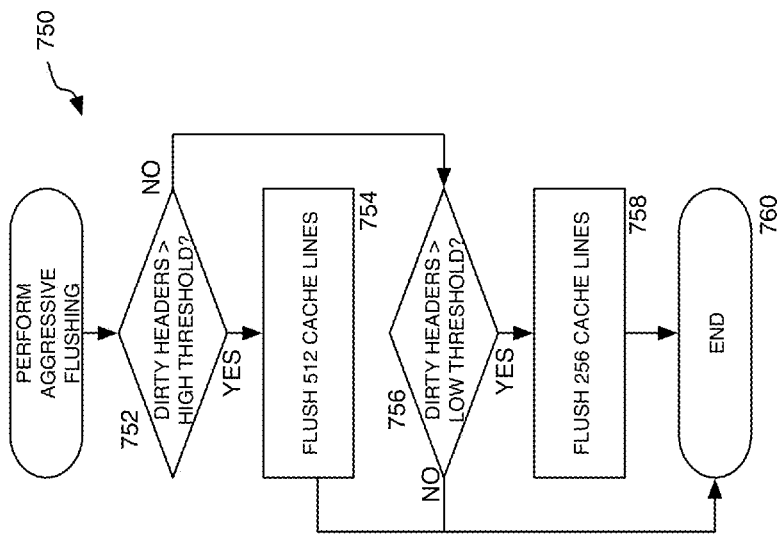
FIGS. 7A-7B and 8 are flow diagrams showing illustrative routines for flushing a disk cache according to embodiments of the invention.
Figure 7A:
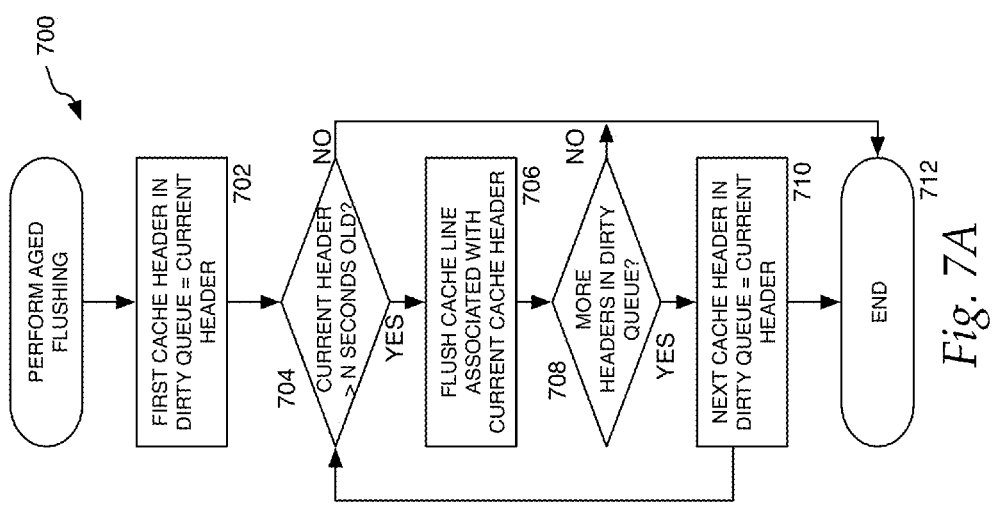

Referring now to FIGS. 7A-11C, additional details will be provided regarding the aspects of the invention for flushing a cache line without locking. Flushing data from the cache is an independent activity that is performed by a separate thread. This thread executes in two situations. First, this thread is periodically woken up to flush cache pages that have aged a predetermined number of seconds (ten second in one embodiment) or more. This is called aged flushing and is illustrated in FIG. 7A, and is done to minimize the data loss that an unexpected power loss or a disastrous system crash will cause. Second, whenever the number of dirty headers becomes unacceptably large, a flush cycle is initiated. This is called aggressive flushing and is done so as to mitigate a situation in the future where there are no cache headers available for I/Os, which may cause a timeout on those I/Os. Aggressive flushing is illustrated in FIG. 7B.

As described briefly above, aged flushing is performed by waking up the flush thread periodically (every one second in one embodiment). As also described briefly above, each time a cache line becomes dirty, the time at which it became dirty is recorded in the cache header and the cache header is moved to the end of the dirty queue 502. The aged flushing process scans the dirty queue 502 and flushes all cache lines which are more than a predetermined number of seconds old. The search stops as soon as the first non-aged cache line is found due to the LRU nature of the dirty queue 502. An illustrative routine 700 shown in FIG. 7A illustrates the operation of the aged flushing process further.

The routine 700 begins at operation 702, where the first cache header in the dirty queue 502 is identified as the current header. The routine 700 then continues to operation 704, where a determination is made as to whether the current header is greater than a predetermined number of seconds old. If not, the routine 700 branches to operation 712, where it ends. If the current header is greater than a predetermined number of seconds old, the routine 700 continues from operation 704 to operation 706.

Figure 8:
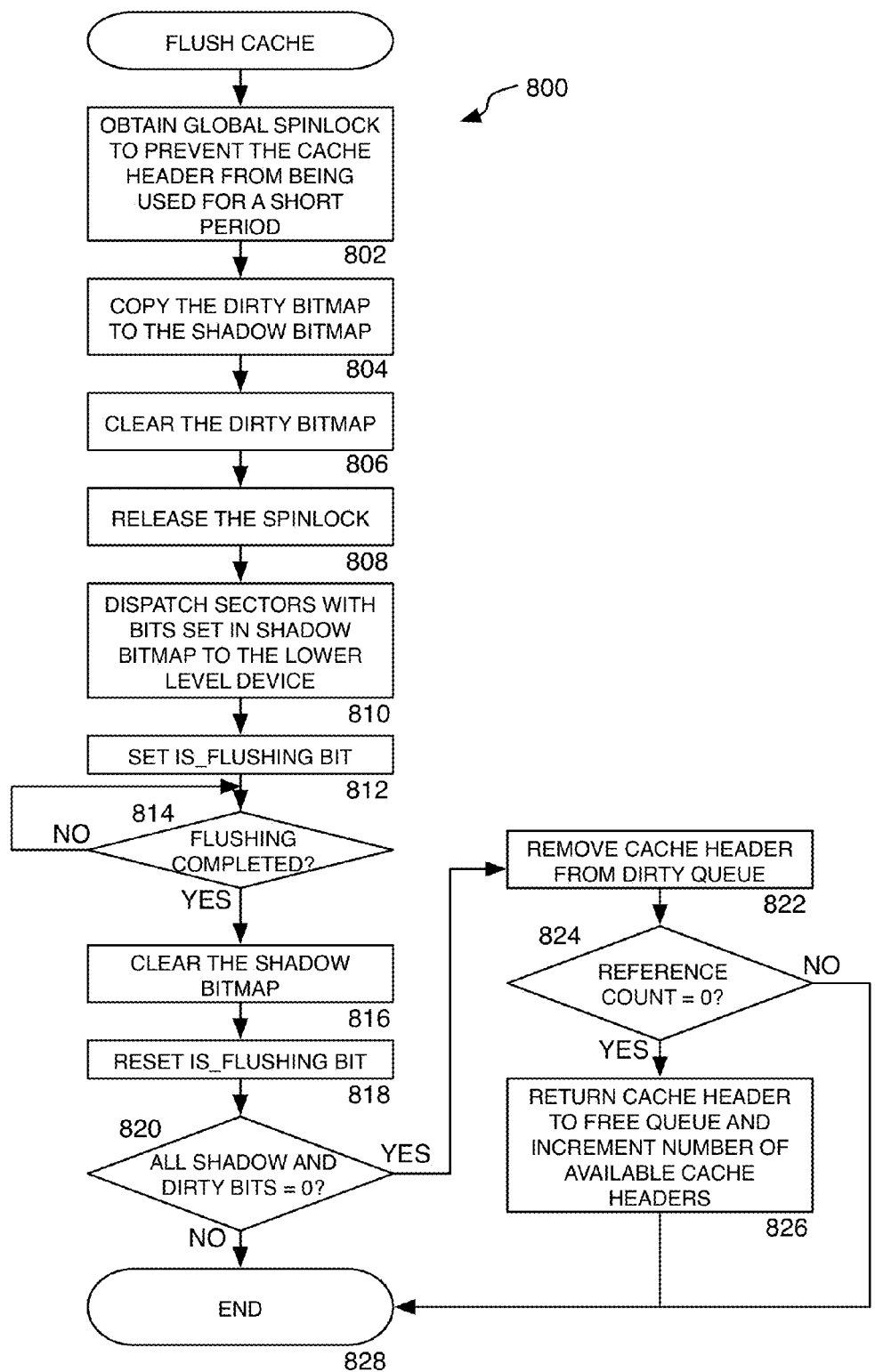

At operation 706, the dirty sectors in the cache line associated with the current header is flushed. FIG. 8 illustrates the process by which the actual sectors are flushed without locking the cache line. Once the cache line has been flushed, the routine 700 continues to operation 708 where a determination is made as to whether more headers exist in the dirty queue 502. If not, the routine 700 branches to operation 712, where it ends. If so, the routine 700 continues to operation 710, where the next cache header in the dirty queue 502 is set to the current header. The routine 700 then branches from operation 710 back to operation 704, described above.

When the cache module comes under memory pressure, the operating system of the computer 2 tries various methods of freeing memory. One of these methods is to signal kernel processes of the need to free memory pages. The cache module has an out-of-memory hook in the kernel so that a semaphore is raised whenever there is memory pressure in the system. The raising of this semaphore triggers a thread to release pages. If pages cannot be released because too many of them are dirty, the flush thread begins aggressive flushing. If the number of dirty headers in the system is greater than a high threshold, 512 cache lines are flushed. If the number of dirty headers in the system is greater than a low threshold, 256 lines are flushed. An illustrative routine 750 shown in FIG. 7B illustrates this aspect of the aggressing flushing process.

The routine 750 begins at operation 752, where a determination is made as to whether the number of dirty headers is greater than a preset high threshold. If not, the routine 750 branches to operation 756. If so, the routine 750 continues to operation 754 where 512 cache lines are flushed. The routine 750 then continues from operation 754 to operation 760, where it ends.

At operation 756, a determination is made as to whether the number of dirty headers is greater than a preset low threshold. If not, the routine 750 branches to operation 760, where it ends. If so, the routine 750 continues to operation 758 where 256 cache lines are flushed. FIG. 8 illustrates the process by which the actual sectors are flushed without locking the cache line. The routine 750 then continues from operation 758 to operation 760, where it ends. It should be appreciated that the number of cache lines flushed in response to determining that the number of dirty headers exceeds a low or high threshold is merely illustrative and that different numbers of cache lines may be flushed.

Figure 9D:
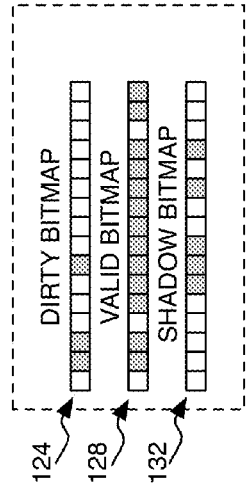
FIGS. 9A-9E are data structure diagrams illustrating the contents of several bitmaps provided by embodiments of the invention during an illustrative flush operation.
Figure 9E:
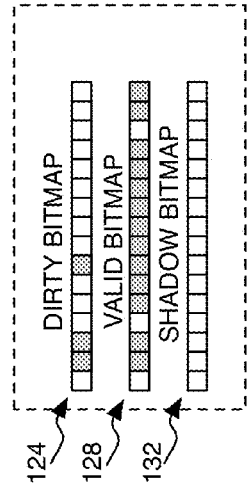
Figure 9A:
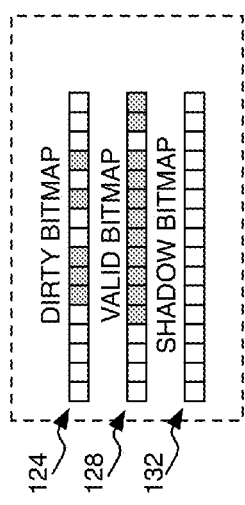

FIG. 8 illustrates a process 800 for flushing a cache line without locking it according to one embodiment of the invention. FIG. 8 will now be discussed in conjunction with FIGS. 9A-9E, which illustrate the contents of an exemplary dirty bitmap 126, valid bitmap 130, and shadow bitmap 134. FIG. 9A illustrates the contents of these bitmaps prior to beginning the process of flushing the associated cache line.

Figure 9B:
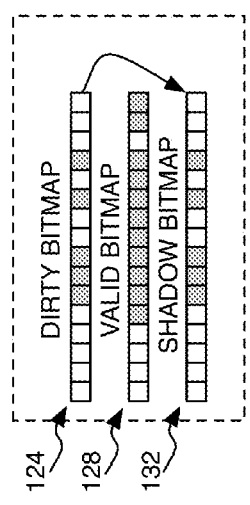
Figure 9C:
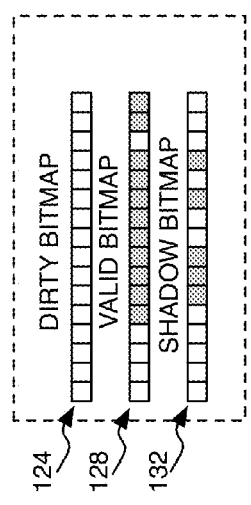

The routine 800 begins at operation 802, where a global spinlock is obtained to prevent the cache header from being used for a short period of time. The routine 800 then continues to operation 804, where the contents of the dirty bitmap 124 are copied to the shadow bitmap 132. This is illustrated in FIG. 9B. Once the copying has been completed, the routine 800 continues to operation 806, where the contents of the dirty bitmap 124 are cleared. This is illustrated in FIG. 9C. Once the dirty bitmap 124 is cleared, the routine 800 then continues to operation 808, where the spinlock is released thereby allowing access to the dirty bitmap 124. Once the spinlock is released, the dirty bitmap 124 may be modified even though the flushing process has not yet completed. This is illustrated in FIG. 9D.

From operation 808, the routine 800 continues to operation 810, where the sectors that have their corresponding bits set in the shadow bitmap 132 are dispatched to the lower-level device. This is performed with the minimum number of operations, taking advantage of coalescing, if possible. When all the sectors have been dispatched, the routine 800 continues to operation 812, where a variable (the is_flushing bit) is set indicating that at least one flushing bit is set and at least some I/O operations have been dispatched. This variable also informs the cache module not to flush the buffer again, thereby ensuring that flushing is rotated and that the same headers are not flushed again.

When the flushing operations have completed, the routine 800 continues from operation 814 to operation 816, where the shadow bitmap 132 is cleared. This is illustrated in FIG. 9E. The routine 800 then continues to operation 818, where the is_flushing variable is reset. From operation 818, the routine 800 continues to operation 820 where a determination is made as to whether all of the bits in the shadow bitmap 132 and the dirty bitmap 124 are zero. If not, the routine 800 continues to operation 828, where it ends. If so, the routine 800 branches to operation 822, where the cache header is removed from the dirty queue 502. The routine 800 then continues to operation 824, where a determination is made as to whether the contents of the reference count field 122 indicate that no processes are utilizing the cache line. If so, the routine 800 continues to operation 826 where the cache header is returned to the free queue 500 and the number of cache headers available is incremented. From operation 826, the routine 800 continues to operation 828, where it ends.

Figure 10:
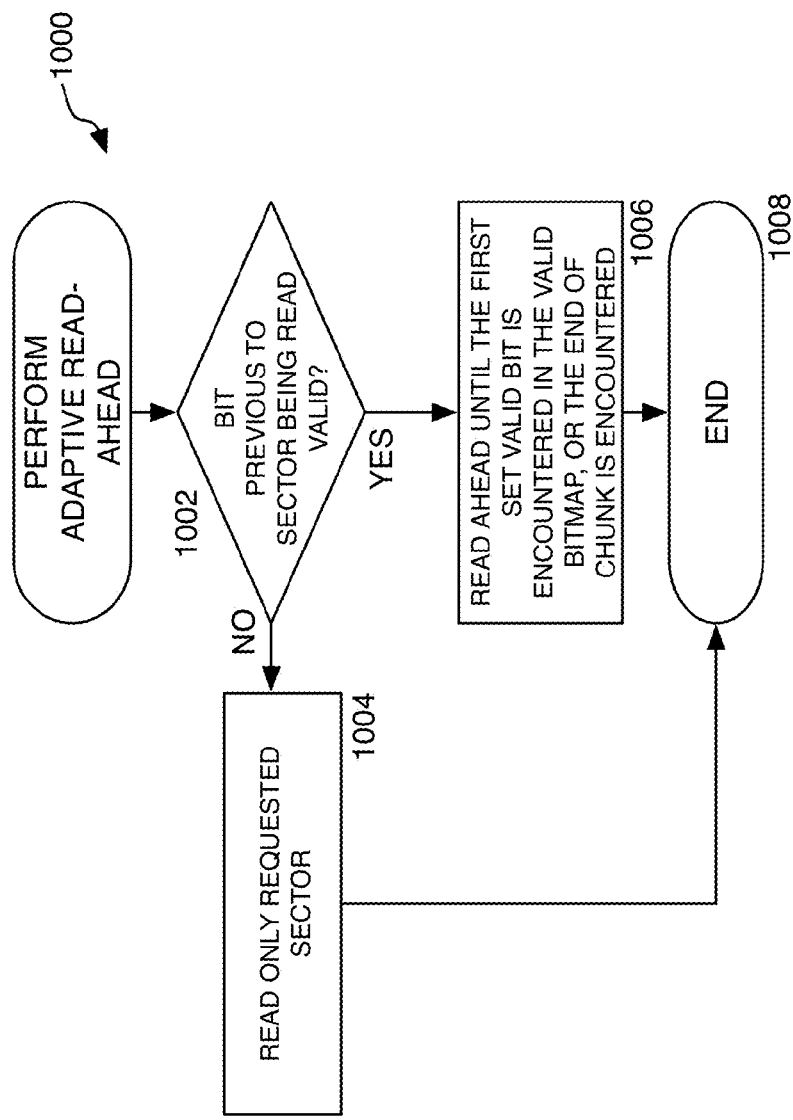
FIG. 10 is a flow diagram showing a process for performing adaptive read-ahead according to one embodiment of the invention.
Figure 11B:
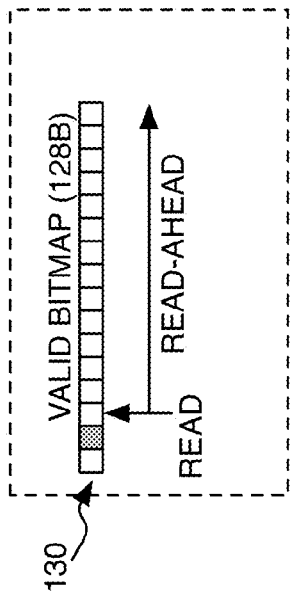
FIGS. 11A-11C are data structure diagrams illustrating the contents of a valid bitmap during several illustrative read-ahead operations.
Figure 11A:
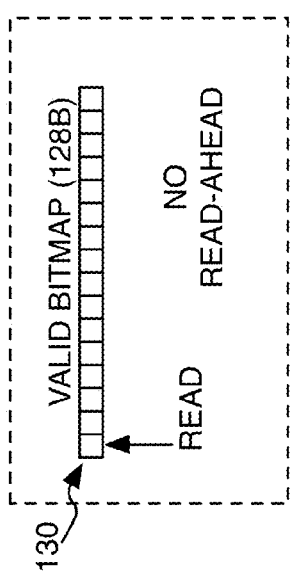
Figure 11C:
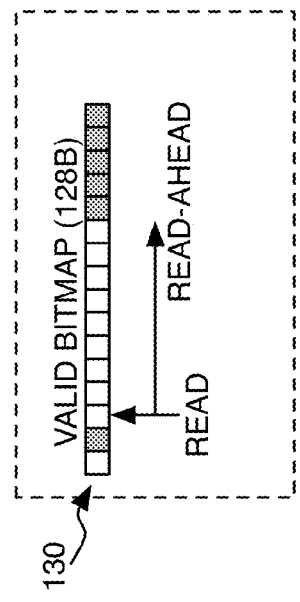

Referring now to FIGS. 10-11C, additional details regarding a process provided by embodiments of the invention for adaptive read-ahead will be described. The primary purpose of this algorithm is to identify when sequential reads are taking place and to perform read-aheads into the cache in the event of such sequential traffic. At the same time, the algorithm needs to ensure that all reads do not become read-aheads, thereby flooding the I/O bandwidth of the disks 4. The algorithm operates by determining whether the bit in the valid bitmap 128 previous to the bit corresponding to the sector being read is valid. Such an occurrence indicates that a prior read probably occurred on the LBA just before the current one and this is taken as the beginning of a sequential read. Accordingly, if this condition is encountered, a read-ahead is performed until the next valid bit is encountered or the end of the valid bitmap 128. FIG. 10 shows an illustrative routine 1000 for implementing this process.

The routine 1000 begins at operation 1002, where a determination is made as to whether the bit in the valid bitmap 128 just previous to the bit corresponding to the sector being read is valid. If not, only the requested sector is read at operation 1004. If the previous bit is valid, the routine 1000 continues to operation 1006 where a read-ahead is performed from the bit corresponding to the sector being read to the end of the valid bitmap 128 or the next bit is encountered that indicates that the corresponding sector is already valid. The routine 1000 then continues from operations 1004 and 1006 to operation 1008, where it ends.

It should be appreciated that, according to one embodiment, the read-ahead process described above is not performed across cache lines. If the first sector of a cache line is being written to, the cache line corresponding to the previous 64 kB is not checked for contiguity. Although such a check would be able to identify some read-ahead operations, the loss of CPU cycles outweighs the benefit, especially since the very next read on the same cache line would result in a read-ahead in the case of a sequential read.

FIGS. 11A-11C show the conditions under which a read-ahead may be performed. In FIG. 11A, a read occurs in the first sector of the cache line. In this case no read ahead is performed because the previous sector is part of another cache line. In FIG. 11B, a read is being performed on the third sector, which immediately follows a valid sector. Therefore, a read-ahead is performed for all of the sectors until the end of the valid bitmap is reached. In FIG. 11C, a read is also being performed on the third sector, which immediately follows a valid sector. However, in this case, a valid sector is indicated by the thirteenth bit in the valid bitmap. Accordingly, the read-ahead only occurs for the sectors corresponding to the third through twelfth bits in the valid bitmap.

It will be appreciated that embodiments of the present invention provide a method, apparatus, system, and computer-readable medium for implementing disk caching in a computer system. Although the invention has been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments of the invention, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for flushing a portion of a disk cache, the method comprising:
   maintaining a valid bitmap and a dirty bitmap for a cache line, the valid bitmap comprising a plurality of bits corresponding to sectors of the cache line wherein each bit is utilized to indicate whether the corresponding sector of the cache line is valid in the disk cache and can be used to satisfy read requests, and the dirty bitmap comprising one or more bits that each correspond to a sector of the cache line and that each indicate whether the corresponding sector includes data that needs to be flushed to a disk;
   locking the dirty bitmap using a spinlock;
   copying the contents of the dirty bitmap to a shadow bitmap, the shadow bitmap comprising the one or more bits that each correspond to a sector of the cache line and that each indicate whether the corresponding sector includes data that needs to be flushed to a disk;
   determining whether copying has been completed;
   in response to determining that copying has been completed, clearing the contents of the dirty bitmap;
   releasing the spinlock to allow access to the dirty bitmap;
   identifying, based on the contents of the shadow bitmap, the sectors of the cache line that need to be flushed;
   flushing the identified sectors to the disk, wherein the cache line is unlocked while the identified sectors are being flushed;
   determining whether flushing has been completed; and
   in response to determining that flushing has been completed, clearing the contents of the shadow bitmap, wherein the contents of the dirty bitmap are cleared before flushing has been completed.

2. The method of claim 1, wherein the dirty bitmap and the shadow bitmap are stored together in a data structure associated with the cache line, and wherein the method further comprises locking the data structure during a time period necessary to copy the contents of the dirty bitmap to the shadow bitmap and to clear the dirty bitmap.

3. The method of claim 2, wherein the data structure is associated with a dirty queue if any of the bits of the dirty bitmap have been set, and wherein the method further comprises removing the data structure from the dirty queue if all of the bits of the dirty bitmap and the shadow bitmap have been reset.

4. The method of claim 3, wherein the data structure further comprises a reference count field for storing data identifying the number of requests that are referencing the cache line associated with the data structure, and wherein the method further comprises:
   determining if the contents of the reference count field indicates that no requests are referencing the cache line associated with the data structure; and
   in response to determining that no requests are referencing the cache line associated with the data structure, associating the data structure with a queue that references available data structures and incrementing a variable that indicates the number of available data structures.

5. The method of claim 1, further comprising modifying the dirty bitmap after releasing the spin lock to allow access to the dirty bitmap and before flushing has been completed.

6. A non-transitory computer-readable storage medium having computer executable instructions stored thereon that, when executed by a storage system computer, cause the computer to:
   maintain a valid bitmap and a dirty bitmap for a cache line, the valid bitmap comprising a plurality of bits corresponding to sectors of the cache line wherein each bit is utilized to indicate whether the corresponding sector of the cache line is valid in a disk cache and can be used to satisfy read requests, and the dirty bitmap comprising one or more bits that each correspond to a sector of the cache line and that each indicate whether the corresponding sector includes data that needs to be flushed to a disk;
   lock the dirty bitmap using a spinlock;

copy the contents of the dirty bitmap to a shadow bitmap, the shadow bitmap comprising the one or more bits that each correspond to a sector of the cache line and that each indicate whether the corresponding sector includes data that needs to be flushed to a disk;

determine whether copying has been completed;

in response to determining that copying has been completed, clear the contents of the dirty bitmap;

release the spinlock to allow access to the dirty bitmap;

identify, based on the contents of the shadow bitmap, the sectors of the cache line that need to be flushed;

flush the identified sectors to the disk, wherein the cache line is unlocked while the identified sectors are being flushed;

determine whether flushing has been completed; and in response to determining that flushing has been completed, clear the contents of the shadow bitmap, wherein the contents of the dirty bitmap are cleared before flushing has been completed.

7. The non-transitory computer-readable storage medium of claim 6, wherein the dirty bitmap and the shadow bitmap are stored together in a data structure associated with the cache line, and having further computer-executable instructions stored thereon that, when executed by the computer, cause the computer to lock the data structure during a time period necessary to copy the contents of the dirty bitmap to the shadow bitmap and to clear the dirty bitmap.

8. The non-transitory computer-readable storage medium of claim 7, wherein the data structure is associated with a dirty queue if any of the bits of the dirty bitmap have been set, and having further computer-executable instructions stored thereon that, when executed by the computer, cause the computer to remove the data structure from the dirty queue if all of the bits of the dirty bitmap and the shadow bitmap have been reset.

9. The non-transitory computer-readable storage medium of claim 8, wherein the data structure further comprises a reference count field for storing data identifying the number of requests that are referencing the cache line associated with the data structure, and having further computer-executable instructions stored thereon that, when executed by the computer, cause the computer to:

determine if the contents of the reference count field indicates that no requests are referencing the cache line associated with the data structure; and in response to determining that no requests are referencing the cache line associated with the data structure, associate the data structure with a queue that references available data structures and increment a variable that indicates the number of available data structures.

10. The non-transitory computer-readable storage medium of claim 6, having further computer-executable instructions stored thereon that, when executed by the computer, cause the computer to modify the dirty bitmap after releasing the spin lock to allow access to the dirty bitmap and before flushing has been completed.

11. A system for flushing a portion of a disk cache, the system comprising:

a mass storage device;

a storage server computer operatively connected to the mass storage device; and a cache module executing on the storage server computer and configured to maintain a valid bitmap and a dirty bitmap for a cache line, the valid bitmap comprising a plurality of bits corresponding to sectors of the cache line wherein each bit is utilized to indicate whether the corresponding sector of the cache line is valid in the disk cache and can be used to satisfy read requests, and the dirty bitmap comprising one or more bits that each correspond to a sector of the cache line and that each indicate whether the corresponding sector includes data that needs to be flushed to disk, lock the dirty bitmap using a spinlock, copy the contents of the dirty bitmap to a shadow bitmap, the shadow bitmap comprising the one or more bits that each correspond to a sector of the cache line and that each indicate whether the corresponding sector includes data that needs to be flushed to a disk, determine whether copying has been completed, in response to determining that copying has been completed, clear the contents of the dirty bitmap, release the spinlock to allow access to the dirty bitmap, identify, based on the contents of the shadow bitmap, the sectors of the cache line that need to be flushed, flush the identified sectors to the mass storage device, wherein the cache line is unlocked while the identified sectors are being flushed, determine whether flushing has been completed, and in response to determining that flushing has been completed, clear the contents of the shadow bitmap, wherein the contents of the dirty bitmap are cleared before flushing has been completed.

12. The system of claim 11, wherein the dirty bitmap and the shadow bitmap are stored together in a data structure associated with the cache line, and wherein the cache module is further configured to lock the data structure during a time period necessary to copy the contents of the dirty bitmap to the shadow bitmap and to clear the dirty bitmap.

13. The system of claim 12, wherein the data structure is associated with a dirty queue if any of the bits of the dirty bitmap have been set, and wherein the cache module is further configured to remove the data structure from the dirty queue if all of the bits of the dirty bitmap and the shadow bitmap have been reset.

14. The system of claim 13, wherein the data structure further comprises a reference count field for storing data identifying the number of requests that are referencing the cache line associated with the data structure, and wherein the cache module is further configured to:

determine if the contents of the reference count field indicates that no requests are referencing the cache line associated with the data structure; and in response to determining that no requests are referencing the cache line associated with the data structure, associate the data structure with a queue that references available data structures and increment a variable that indicates the number of available data structures.

15. The system of claim 11, wherein the cache module is further configured to modify the dirty bitmap after releasing the spin lock to allow access to the dirty bitmap and before flushing has been completed.

* * * * *